US010476935B2

(12) United States Patent
Yuan

(10) Patent No.: US 10,476,935 B2
(45) Date of Patent: *Nov. 12, 2019

(54) AUTOMATIC POPULATION OF A NETWORK ACCESSIBLE CONTENT COLLECTION

(71) Applicant: eBay Inc., San Jose, CA (US)

(72) Inventor: Mark Delun Yuan, San Mateo, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/046,060

(22) Filed: Jul. 26, 2018

(65) Prior Publication Data

US 2018/0343297 A1 Nov. 29, 2018

Related U.S. Application Data

(63) Continuation of application No. 15/701,059, filed on Sep. 11, 2017, now Pat. No. 10,057,328, which is a continuation of application No. 15/233,558, filed on Aug. 16, 2016, now Pat. No. 9,762,652, which is a continuation of application No. 13/689,154, filed on Nov. 29, 2012, now Pat. No. 9,438,684.

(51) Int. Cl.

| G06F 15/16 | (2006.01) |
|---|---|
| H04L 29/08 | (2006.01) |
| G06F 16/9535 | (2019.01) |
| H04L 12/58 | (2006.01) |
| H04L 29/06 | (2006.01) |

(52) U.S. Cl.
CPC .......... *H04L 67/06* (2013.01); *G06F 16/9535* (2019.01); *H04L 51/046* (2013.01); *H04L 67/02* (2013.01); *H04L 67/22* (2013.01); *H04L 67/42* (2013.01)

(58) Field of Classification Search
CPC ......... H04L 67/06; H04L 67/02; H04L 67/22; G06F 17/30867
See application file for complete search history.

(56) References Cited

U.S. PATENT DOCUMENTS

| 8,825,783 | B1 * | 9/2014 | Nace | G06Q 10/10 |
|---|---|---|---|---|
| | | | | 709/206 |
| 9,154,559 | B1 * | 10/2015 | Bovee | H04L 67/16 |
| 9,438,684 | B2 | 9/2016 | Yuan | |
| 9,762,652 | B2 | 9/2017 | Yuan | |

(Continued)

OTHER PUBLICATIONS

"U.S. Appl. No. 13/689,154, Non Final Office Action dated Dec. 18, 2014", 10 pgs.

(Continued)

*Primary Examiner* — Arvin Eskandarnia
(74) *Attorney, Agent, or Firm* — Schwegman Lundberg & Woessner, P.A.

(57) ABSTRACT

A system, computer-readable storage medium storing at least one program, and computer-implemented method for automatically posting content to a network accessible content collection are described. User activity over a communication network from a client device is tracked and a triggering event is detected. In response to detecting the triggering event, a content item is automatically posted to a network accessible collection of content items viewable by additional users.

20 Claims, 8 Drawing Sheets

(56) References Cited

U.S. PATENT DOCUMENTS

| | | | |
|---|---|---|---|
| 10,057,328 | B2 | 8/2018 | Yuan |
| 2009/0248692 | A1* | 10/2009 | Tsukagoshi ....... G06F 17/30265 |
| 2012/0158845 | A1* | 6/2012 | Baalu .................... G06Q 30/02 |
| | | | 709/204 |
| 2013/0130659 | A1* | 5/2013 | Sadhvani .............. H04W 4/206 |
| | | | 455/414.1 |
| 2013/0132477 | A1* | 5/2013 | Bosworth .............. G06Q 50/01 |
| | | | 709/204 |
| 2014/0149506 | A1 | 5/2014 | Yuan |
| 2014/0214666 | A1* | 7/2014 | Isaacson .............. G06Q 20/105 |
| | | | 705/41 |
| 2016/0352810 | A1 | 12/2016 | Yuan |
| 2017/0374134 | A1 | 12/2017 | Yuan et al. |

OTHER PUBLICATIONS

"U.S. Appl. No. 13/689,154, Examiner Interview Summary dated Apr. 24, 2015", 3 pgs.

"U.S. Appl. No. 13/689,154, Response filed Apr. 20, 2015 to Non Final Office Action dated Dec. 18, 2014", 11 pgs.

"U.S. Appl. No. 13/689,154, Final Office Action dated May 8, 2015", 10 pgs.

"U.S. Appl. No. 13/689,154, Response filed Aug. 10, 2015 to Final Office Action dated May 8, 2015", 11 pgs.

"U.S. Appl. No. 13/689,154, Non Final Office Action dated Nov. 4, 2015", 10 pgs.

"U.S. Appl. No. 13/689,154, Response filed Feb. 3, 2016 to Non Final Office Action dated May 8, 2015", 12 pgs.

"U.S. Appl. No. 13/689,154, Notice of Allowance dated May 6, 2016", 8 pgs.

"U.S. Appl. No. 15/233,558, Preliminary Amendment filed Aug. 30, 2016", 9 pgs.

"U.S. Appl. No. 15/233,558, First Action Interview—Pre-Interview Communication dated Apr. 11, 2017", 4 pgs.

"U.S. Appl. No. 15/233,558, Response Filed Apr. 20, 2017 to First Action Interview—Pre-Interview Communication dated Apr. 11, 2017", 3 pgs.

"U.S. Appl. No. 15/233,558, Notice of Allowance dated May 9, 2017", 8 pgs.

"U.S. Appl. No. 15/701,059, Preliminary Amendment filed Oct. 9 2017", 8 pgs.

"U.S. Appl. No. 15/701,059, Non Final Office Action dated Mar. 7, 2018", 6 pgs.

"U.S. Appl. No. 15/701,059, Response filed Mar. 14, 2018 to Non Final Office Action dated Mar. 7, 2017", 7 pgs.

"U.S. Appl. No. 15/701,059, Notice of Allowance dated Apr. 18, 2018", 8 pgs.

\* cited by examiner

AUTOMATIC POPULATION OF A NETWORK ACCESSIBLE CONTENT COLLECTION

PRIORITY

This application is a continuation of and claims the benefit of priority to Ser. No. 15/701,059, filed Sep. 11, 2017, which is a continuation of and claims the benefit of priority to U.S. patent application Ser. No. 15/233,558, filed on Aug. 10, 2016, which is a continuation of and claims the benefit of priority to U.S. patent application Ser. No. 13/689,154, filed on Nov. 29, 2012, now U.S. Pat. No. 9,438,684, each of which are incorporated by reference herein in their entireties.

TECHNICAL FIELD

This application relates generally to data processing within a network-based system, and more specifically to systems and methods to automatically populate a network accessible content collection.

BACKGROUND

Traditional online social networks and pinboard-style social content sharing websites allow users to create, manage and share content collections with other users. Content collections may, for example, be comprised of videos, audio files, and images. Users may create collections based on a particular theme or category such as events, interests or hobbies. To create each content collection, a user must first locate desired content, which is usually derived from the collection of another user or from a third party website. The user may then be required to then manually upload each content item to the website. Once the content is uploaded to the website, a user is then tasked with manually sorting through each content item and categorizing it for placement in an appropriate collection.

However, the time and effort needed to create a collection that is meaningful to the user may limit the use of such a service. Also, the timing and manual input required for content collection creation may create an undesired lag time from the initial creation of a collection to its completion, which may decrease the popularity and relevance of a particular collection in the minds of the creating user and others who may view the collection. Further, a user's content collections may be limited to only those items which currently exist in the collection of another user or on other websites.

BRIEF DESCRIPTION OF THE DRAWINGS

Some embodiments are illustrated by way of example and not limitation in the figures of the accompanying drawings.

DETAILED DESCRIPTION

Reference will now be made in detail to specific example embodiments contemplated by the inventors for carrying out the inventive subject matter. Examples of these specific embodiments are illustrated in the accompanying drawings. It will be understood that it is not intended to limit the scope of the claims to the described embodiments. On the contrary, it is intended to cover alternatives, modifications, and equivalents as may be included within the scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, the components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope of the concepts disclosed herein. Embodiments may also be tangibly embodied as a set of computer instructions stored on a computer readable medium, such as a memory device.

Aspects of the present disclosure provide systems and methods for automatic population of a network accessible collection of content items. In some embodiments, each content item posted to the collection may be automatically categorized based on attributes of the content. A user's content collection may be populated with content items related to both online and offline activity of a user. User activity may, for example, include browsing websites, online shopping, taking pictures, or physical location check-ins. In some embodiments, users viewing a particular content collection may be provided with recommendations based on the content in the collection.

In some embodiments, a user may specify certain activities or types of activities the user wishes to post to one or more collections of content. For example, a user may specify that only content related to online shopping be posted to a content collection. In another example, the user may specify that only content related to activity occurring within a certain time period (e.g., during an activity sharing session) be posted to content collections.

Figure 1:
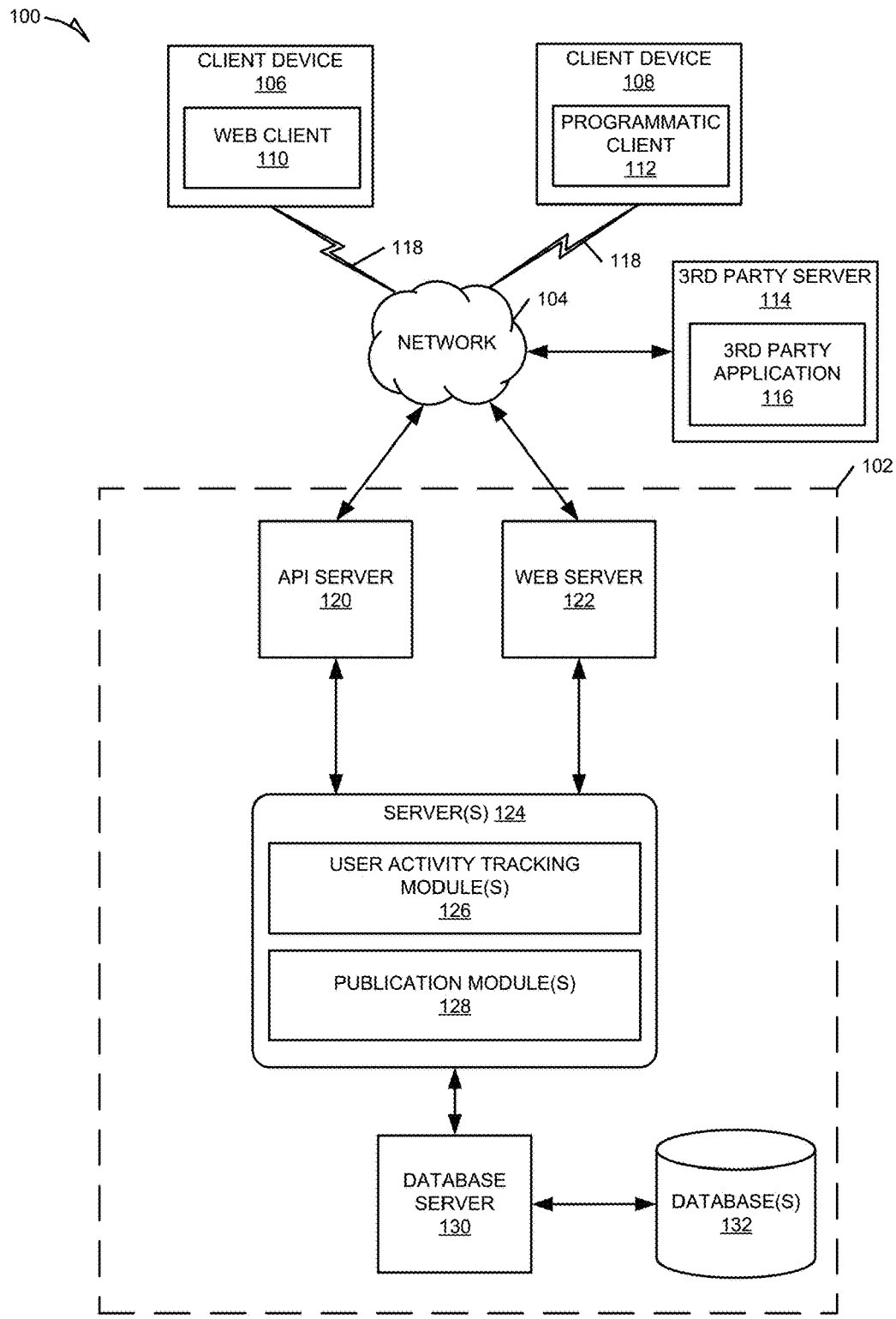
FIG. 1 is a block diagram illustrating a network-based system for automatically populating a network accessible content collection, according to an example embodiment.

FIG. 1 is a network diagram depicting a network system 100, according to one embodiment, having a client-server architecture configured for exchanging data over a network. For example, the network system 100 may be a network-based publisher 102 where clients may communicate and exchange data within the network system 100. The data may pertain to various functions (e.g., user activity) and aspects (e.g., managing content) associated with the network system 100 and its users.

A data exchange platform, in an example form of a network-based publisher 102, may provide server-side functionality, via a network 104 (e.g., the Internet), to one or more client devices. The one or more client devices may be operated by users that use the network system 100 and more specifically, the network-based publisher 102, to exchange data over the network 104. These transactions may include transmitting, receiving (i.e., communicating), and processing data to, from, and regarding content and users of the network system 100. The data may include, but are not limited to, content and user data such as textual, image, audio, and/or video data; product and service reviews; product, service, manufacture, and vendor recommendations and identifiers; product and service listings associated with buyers and sellers; product and service advertisements; visualization data; parcel shipping data; auction bids; and transaction data, among other things.

Further, while the system 100 shown in FIG. 1 employs a client-server architecture, the present inventive subject matter is of course not limited to such an architecture, and could equally well find application in a distributed, or peer-to-peer, architecture system, for example. The various modules of the plurality of servers 124 may also be implemented as standalone systems or software programs, which do not necessarily have networking capabilities.

In various embodiments, the data exchanges within the network system 100 may be dependent upon user-selected functions available through one or more client or user interfaces (UIs). The UIs may be associated with a client device, such as a client device 106 using web client 110. The web client 110 may be in communication with the network-based publisher 102 via a web server 122. The UIs may also be associated with a client device 108 using a programmatic client 112, such as a client application, or a third party server 114 (e.g., one or more servers or client devices) hosting a third party application 116. It can be appreciated in various embodiments that the client device 106, 108, and/or the third party server 114 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

The client devices 106 and 108 may be any of a variety of types of devices (for example, a cellular telephone, a personal digital assistant (PDA), a Personal Navigation Device (PND), a handheld computer, a tablet computer, a desktop computer, a notebook computer, a wearable computing device, or other type of movable device). The client devices 106 and 108 may interface via a connection 118 with a communication network 104 (e.g., the Internet or WAN). Depending on the form of the client device 106 and 108, any of a variety of types of connections 118 and communication networks 104 may be used.

For example, the connection 118 may be Code Division Multiple Access (CDMA) connection, a Global System for Mobile communications (GSM) connection, or other type of cellular connection. Such connection 118 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 104 may include a cellular network that has a plurality of cell sites of overlapping geographic coverage, interconnected by cellular telephone exchanges. These cellular telephone exchanges may be coupled to a network backbone (for example, the public switched telephone network (PSTN), a packet-switched data network, or to other types of networks).

In another example, the connection 118 may be Wireless Fidelity (Wi-Fi, IEEE 802.11x type) connection, a Worldwide Interoperability for Microwave Access (WiMAX) connection, or another type of wireless data connection. In such an embodiment, the network 104 may include one or more wireless access points coupled to a local area network (LAN), a wide area network (WAN), the Internet, or other packet-switched data network.

In yet another example, the connection 118 may be a wired connection, for example an Ethernet link, and the network 104 may be a LAN, a WAN, the Internet, or other packet-switched data network. Accordingly, a variety of different configurations are expressly contemplated.

Turning specifically to the networked-based publisher 102, an application programming interface (API) server 120 and a web server 122 are coupled to, and provide programmatic and web interfaces respectively to, a plurality of servers 124. The servers 124 host one or more user activity tracking module(s) 126, and publication module(s) 128. The plurality of servers 124 may be coupled via these interfaces to the network 104, for example, via wired or wireless interfaces. The plurality of servers 124 are, in turn, shown to be coupled to one or more database server(s) 130 that facilitate access to one or more database(s) 132. In some examples, the plurality of servers 124 can access the database(s) 132 directly without the need for a database server.

The user activity tracking module 126 may be a hardware implemented module or software or instructions stored on a computer-readable medium that is operable to track user activity. The user activity tracking module 126 may, for example, track activity of a user occurring on the client device 106 over network 104. In some embodiments, the user activity tracking module 126 may track activity in accordance with a user preference setting, discussed below in reference to FIG. 2. In some embodiments, the user activity tracking module 126 may be selectively enabled or disabled by a user or automatically. The selective enabling or disabling of the user activity tracking module 126 may be performed independent of the user preferences or triggers of user preferences. The selective enabling or disabling of the user activity tracking module 126 may be effected through actuation of a user interface element, such as a toggle, a switch, or a button, or through actuation of a physical element to which the selective enabling feature is mapped.

The user activity tracked by the user activity tracking module 126 may occur online or offline and may be comprised of several types of user activity. User activity types occurring online may include, by way of non-limiting example, general website browsing, online shopping, viewing media content, reading an online magazine or newspaper, or creating blog or social network posts.

In some embodiments, the user activity tracking module 126 may track offline activity of a user through communications with mobile applications of client device 106 offering location based services. User activity types occurring offline may, for example, include taking pictures with a camera of a client device or a physical location check-in (e.g., hotel, airport, scanning of barcodes or other identifiers, or social network service) using a client device with Global Positioning System (GPS) or other location-sensing capabilities (e.g., client device 106).

In some embodiments, the user activity tracking module 126 is operable to detect a triggering event occurring within the activity of a user. The triggering event may be a specified user activity or type of user activity that triggers automatic posting of a content item to a network accessible collection of content items. For example, a triggering event may be browsing a certain website (or list of websites). For example, a user visiting www.ebay.com may trigger the posting of a content item to a network accessible collection of content items. The content item posted may be an textual or visual indication that the user is visiting www.ebay.com, such as a screenshot of the website, a textual description that the user is visiting the website, or an image associated with the website (e.g., a logo), among other things. In another example, a triggering event may be adding an item to a virtual shopping cart hosted by an online merchant. In yet another example, a triggering event may be a physical location check-in using a mobile device. In still another example, a triggering event may be general online browsing occurring within a specified time period, which may be a user initiated sharing session. In this example, a collection may be formed of a user's browsing activity over a period of time. The collection may be accessible to other users such that they may see what websites and other online resources are being viewed by the user.

In some embodiments, the triggering event(s) may be specified by the user in a preference setting of the network-based publisher 102 (discussed in detail below). Each user may specify a list of triggering events to trigger the posting of a content item to a network accessible collection of content items.

The user activity tracking module 126 may be operatively coupled to one or more publication modules 128. The publication module(s) 128 may be a hardware implemented module or software or instructions stored on a computer-readable medium that is operable to publish content related to user activity to a network accessible content collection. The publication module(s) 128 may provide a number of publisher functions and services (e.g., automatic posting of content, categorizing content, providing recommendations, etc.) to users that access the network-based publisher 102. For example, the publication application(s) 128 may provide a number of services and functions to users for selecting content items based on user activity, automatically posting content items to a collection of content items, and automatically categorizing each content item of the collection of content based on attributes of the content. Additionally, the publication module(s) 128 may provide recommendations to users viewing another user's collection of content items.

Database server 130 may facilitate access to one or more databases 132 and retrieve data for inclusion in the presentation data. The data may correspond to user activity information, content related to user activity, user preference settings, user recommendations, coupons or advertisements, listings of products or related products offered for sale, and so forth. In some embodiments, the database(s) 132 may include databases both internal to the network-based publisher 102 and external.

FIG. 1 also illustrates a third party application 116 that may execute on a third party server 114 and may have programmatic access to the network-based publisher 102 via programmatic interface provided by the API server 120. For example, the third party application 116 may use information retrieved from the network-based publisher 102 to support one or more features or functions on a website hosted by the third party. The third party website may, for example, be a website that may provide one or more functions to a user that may be tracked by user activity tracking module 126. In another example, the third party website may be a social network service providing network accessible content collections to users.

Figure 2:
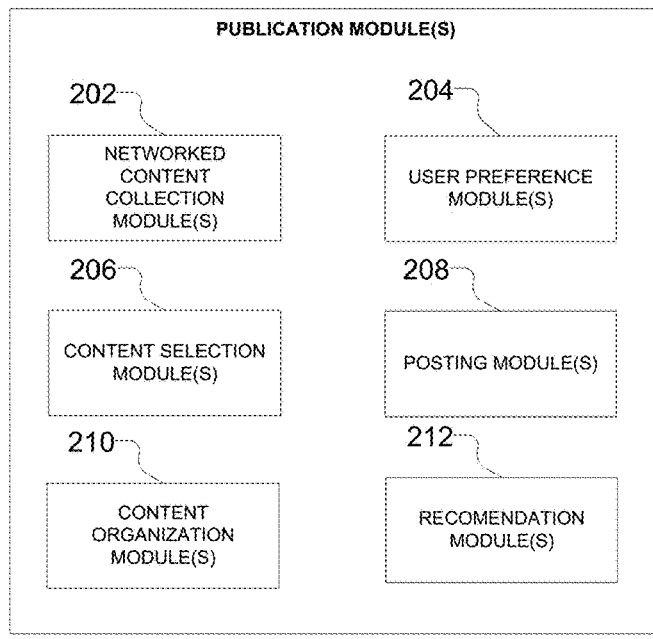
FIG. 2 is a block diagram illustrating multiple publication modules, which may be provided as part of a network-based publication system, according to some example embodiments.

FIG. 2 is a block diagram illustrating an example embodiment of multiple publication module(s) 128, which are provided as part of the network-based publisher 102. The publication module(s) 128 may be hosted on dedicated or shared server machines (not shown) that are communicatively coupled to enable communications between server machines. The publication module(s) 128 themselves are communicatively coupled (e.g., via appropriate interfaces) to each other and to various data sources, so as to allow information to be passed between the publication module(s) 128 or so as to allow the publications module(s) 128 to share and access common data. The publication module(s) 128 may furthermore access servers 124 and one or more databases 132 via database servers 130.

As illustrated in FIG. 2, the publication modules 128 are shown to include one or more networked content collection module(s) 202. The networked content collection module(s) 202 may provide programmatic access to one or more users to maintain a network accessible collection of content items. Each user may maintain one or more network accessible content collections. The networked content collection module(s) 202 may also provide access to one or more users to view the content collections of other users. Each of the networked content collections may include audio, video, image, or text content.

In some embodiments, the user may specify how the content is to be organized and categorized. In other embodiments, the content collection is automatically organized by one or more content organization module(s) 210. Each of the content collections may be organized, for example, by a specified theme, a subject matter, content type, date of inclusion into the collection, or any other attribute of the content. Organization and categorization of content may include extraction and determination of items or objects contained with content items. For example, image recognition techniques may be performed on an image to extract and determine the identity of items contained in the image. Optical character recognition may be performed on content items to extract text contained in the content items. Audio fingerprinting and extraction may be performed on audio files to determine an identity of the audio file.

As illustrated in FIG. 2, the publication modules 128 are shown to include one or more user preference module(s) 204, which may allow a user to specify, via a user interface of web server 122, one or more user preferences related to the automatic population of a network accessible content collection. The user preferences may include a list of one or more triggering events occurring within the activity of the user that the user desires to trigger the population of a content collection. In some embodiments, the user preference setting may also include access permissions for additional users to view a particular content collection. The user preference settings may also include access credentials for one or more online member profiles for websites hosted by the third party server 114.

In some embodiments, a preference setting may include a time period or a location for which a user activity sharing session may occur. In this embodiment, the user activity tracking module 126 may track only activities occurring during the user activity sharing session. In other embodiments, the list of triggering events may include specific times and specific locations that may trigger the population of a content collection.

In some embodiments, a user may not specify user preference settings. In this embodiment, the user preference module(s) 204 may automatically select a set of default user preference settings, which may include one or more default triggering events.

As illustrated in FIG. 2, the publication module(s) 128 may also include one or more content selection module(s) 206, which may analyze user activity tracking data received from the user activity tracking module 126 and select one or more content items from that data for posting to the networked content collection module(s) 202. The one or more content items may be one of a variety of content types including, for example, an audio file, an image, a video, or an electronic article.

In some embodiments, the selection of content may be based on the type of user activity for which the content item is being posted. For example, the content selection module(s) 206 may select an image of a product to post to the networked content collection module(s) 202 for user activity that includes online shopping for the product. In some embodiments, the type of content selected for each user activity type may be specified by the user, via the user interface of web server 122, at the user preference module(s) 204.

In some embodiments, the selection of content may be based on the availability of content related to the user activity. For example, the content selection module(s) 206 may select an image of a location based on user activity data that includes a user physical location check-in. In this example, the image of the location may be the only available content related to the physical location check-in.

As illustrated in FIG. 2, the publication module(s) 128 may include one or more posting module(s) 208. In some embodiments, the posting module(s) 208 may post the one or more content items, obtained from the content selection module(s) 206, to the networked content collection module(s) 202. In some embodiments, the posting module(s) 208 may post one or more content items, obtained from the content selection module(s) 206, to a network content collection hosted by a third party server 114.

The posting module(s) 208 may automatically post the one or more content items in real-time, without interaction from the user, as the user activity data is received from the user activity tracking module 126. In some embodiments, the posting module(s) 208 may automatically post the one or more content items in real-time, without interaction from the user, in response to the user activity tracking module 126 detecting a triggering event.

As illustrated in FIG. 2, the publication module(s) 128 may include one or more content organization module(s) 210, which may automatically organize, categorize, and create collections of content items for inclusion into the networked content collection module(s) 202 of the network-based publisher 102 or a networked content collection hosted by third party server 114. The content organization module(s) 210 may assign a category to each content item and organize each collection by category. Content items may be categorized by attributes of the content. The attributes used to categorize content may, for example, include subject matter, content type, user activity type, the timing of the related user activity, location of the user activity, color, or size of the content. For example, the content organization module(s) 210 may categorize and organize all content items related to an online shopping session into one single collection of content items. For example, users may be able to view a collection of content items related to an online shopping session performed by another user, such as a connoisseur or celebrity. The content items may not only include items purchased by the user, but also items or pages viewed by the user. In this respect, in some embodiments, users may be able to see what a celebrity is viewing and obtain information on the latest trends for a particular subject matter. In another example, the content organization module 210 may categorize a group of images obtained from a client device 106 from one particular location. In this respect a user may share images from a trip or outing with other users without the necessity of uploading or selecting each image for posting to a third party social network. The sharing of images may be automatically performed and posted to a content collection for all or some users to view.

In some embodiments, the content organization module(s) 210 may organize, categorize and create a collection of content for all user activity for a user specified time period (e.g., a user activity sharing session). a user activity sharing session). In some embodiments, the posting module 208 and the content organization modules) 210 may categorize and post content items to different content collections. For example, if a user is performing an online shopping session that the user has chosen to share through the content collections, different items or types of items may be posted to different content collections as the user browses one or more e-commerce websites. Thus, different sets of shoes that the user views may be posted to a "shoes" collection and different electronics items that the user views may be posted to an "electronics" collection. In another example, if a user decides to share a general online browsing session, different types of articles read by the user may be posted to different collections. For example, sports articles may be posted to a "sports" collection, while news articles may be posted to a "current events" collection.

As illustrated in FIG. 2, the publication module(s) 128 may also include one or more recommendation module(s) 212 to provide users with recommendations based on the user activity data used to populate the networked content collection. In some embodiments, the recommendation module(s) 212 may provide a recommendation to a user based on the user's activity. In other embodiments, the recommendation module(s) 212 may provide a user who may be viewing a particular content collection with a recommendation based on the contents of the collection. The form in which the recommendation may be presented is not intended to be limited. The recommendation may take the form of another content item presented with the content collection, a banner or other type of display advertisement, a pop-up or pop-under advertisement, an interstitial advertisement, a notification, an email, or a text message among other things.

In some embodiments, a recommendation may include a link for a website or list of websites having content or other items that are related to the user activity. For example, the recommendation module(s) 212 may provide a user with a list of similar products when that user's activity includes shopping online for a particular product. In another example, the recommendation module(s) 212 may provide a first user viewing a second user's content collection, including images of vintage cars, with a link to a third party website that may host images and information for vintage cars. In yet another example, a first user viewing a second user's content collection related to the second user's physical location check-in at a particular restaurant may be provided with reviews, directions, or a menu related to the restaurant. In some embodiments, conversion of a recommendation into a sale of an item may cause a referral fee or other incentive to be paid to the user who created the content collection associated with the recommendation. The referral fee may take the form of an amount of money, a credit, a discount off a future purchase associated with a website, a coupon associated with a website, a promotion associated with the user's content collection (such as featuring the content collection more prominently on a website), and the like.

Figure 3:
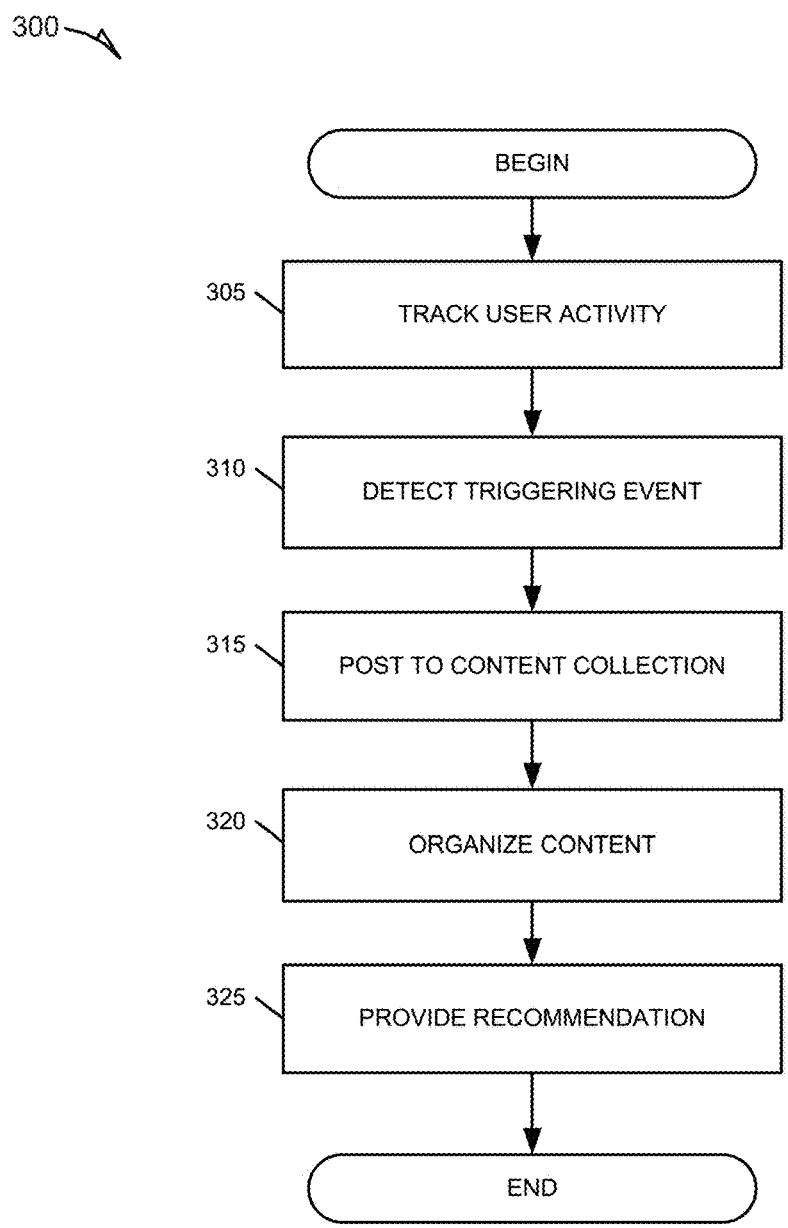
FIG. 3 is a flowchart illustrating a method for automatically populating a network accessible content collection, according to an example embodiment.

FIG. 3 shows a flowchart illustrating an example method 300 for automatic population and organization of a networked content collection, according to an example embodiment. In this example, the method 300 may include operations such as tracking user activity (operation 305), detecting a triggering event (operation 310), posting to a network accessible content collection (operation 315), organizing the network accessible content collection (operation 320), and providing additional users with a recommendation (operation 325).

At operation 305, the user activity tracking module 126 may track user activity of a user on a client device (e.g., client device 106) over a communication network (e.g., network 104). The activity of the user may include both online (e.g., browsing, shopping, reading online articles) and offline (e.g., taking pictures, physical location check-in) activities. In some embodiments, the user activity tracking module 126 may only track activity during a specified time period (e.g., an activity sharing session established by the user). The parameters for tracking activity may be default or determined based on user preferences.

At operation 310, the user activity tracking module 126 may detect, using one or more processors, a triggering event. The triggering event may be associated with a list of specified types of user activity that trigger automatic posting of a content item to a network accessible collection of content items viewable by additional users. In some embodiments, the triggering event may be specified by the user, via a user interface of web server 122, at user preference module (s) 204.

In response to the detecting of the triggering event, the posting module(s) 208 may automatically post the content item to the network accessible collection of content items (e.g., networked content collection module(s) 202), at operation 315. The content collection may be accessed and viewed by additional users.

The method 300 may optionally include the step of automatically categorizing and organizing the content of the content collection based on at least one attribute of the content. These attributes may, for example, include the time, location, frequency, or type of user activity or the subject matter, color, font, or type of content.

The method 300 may also optionally include the step of providing the additional users with a recommendation based on the content of the content collection at operation 325. Depending on the type of user activity for which the content is used to populate the collection, these recommendations may take a variety of forms. For example, a recommendation may include a link for a website or list of websites having content or other items that are related to products included in the content collection.

Figure 4:
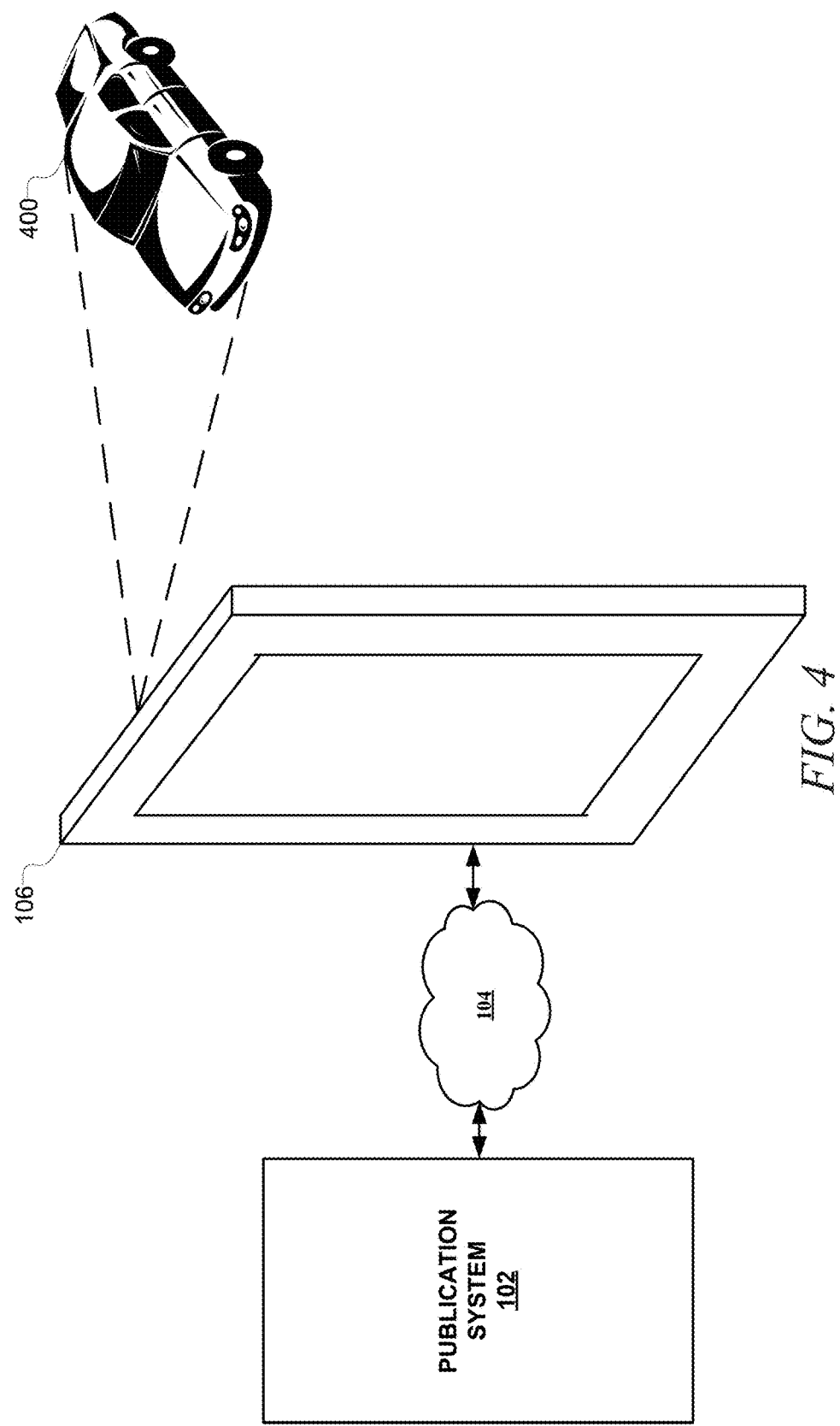
FIG. 4 is a diagram illustrating user activity and the population of a content collection based on the activity, according to some example embodiments.

FIG. 4 illustrates an example client device 106 in the form of a mobile tablet computer. Other client devices may include, but are not limited to, laptop computers and mobile phones (e.g., smart phones). In various embodiments, the client device 106 includes at least one processor, display, image capture device, network interface, and input device. The display may be a touchscreen or non-interactive display. In an embodiment, the image capture device is a camera. The network interface may be configured to transmit and receive on multiple frequencies (e.g., 4G, 3G, 802.11, etc.) over the network 104 with network-based publisher 102. The input device may be a keyboard, touchscreen, gesture capture, stylus, or a combination thereof. In various embodiments, the client device 106 also includes one or more applications that are executed by at least one processor. The executed applications may be configured to perform the functions and methods described herein.

FIG. 4 further shows an object 400. In one embodiment, the object 400 is a car. FIG. 4 illustrates an example type of user activity in the form of capturing an image of the object 400 using the image capture device of client device 106. In some embodiments, the capturing of an image by the image capture device of the client device 106 may be a specified triggering event that triggers the posting of content to a networked content collection. In this embodiment, the user activity tracking module 126 of network-based publisher 102 may track the activity of the user on the client device 106 over network 104 and detect the capturing of the image of the object 400 as a triggering event. Upon detecting the triggering event, the content selection module(s) 206 may select the captured image. The posting module(s) 208 of network-based publisher 102 may then automatically post the image to a network accessible content collection (e.g., the networked content collection module(s) 202 or third party application 116).

Example User Interfaces

Figure 5:
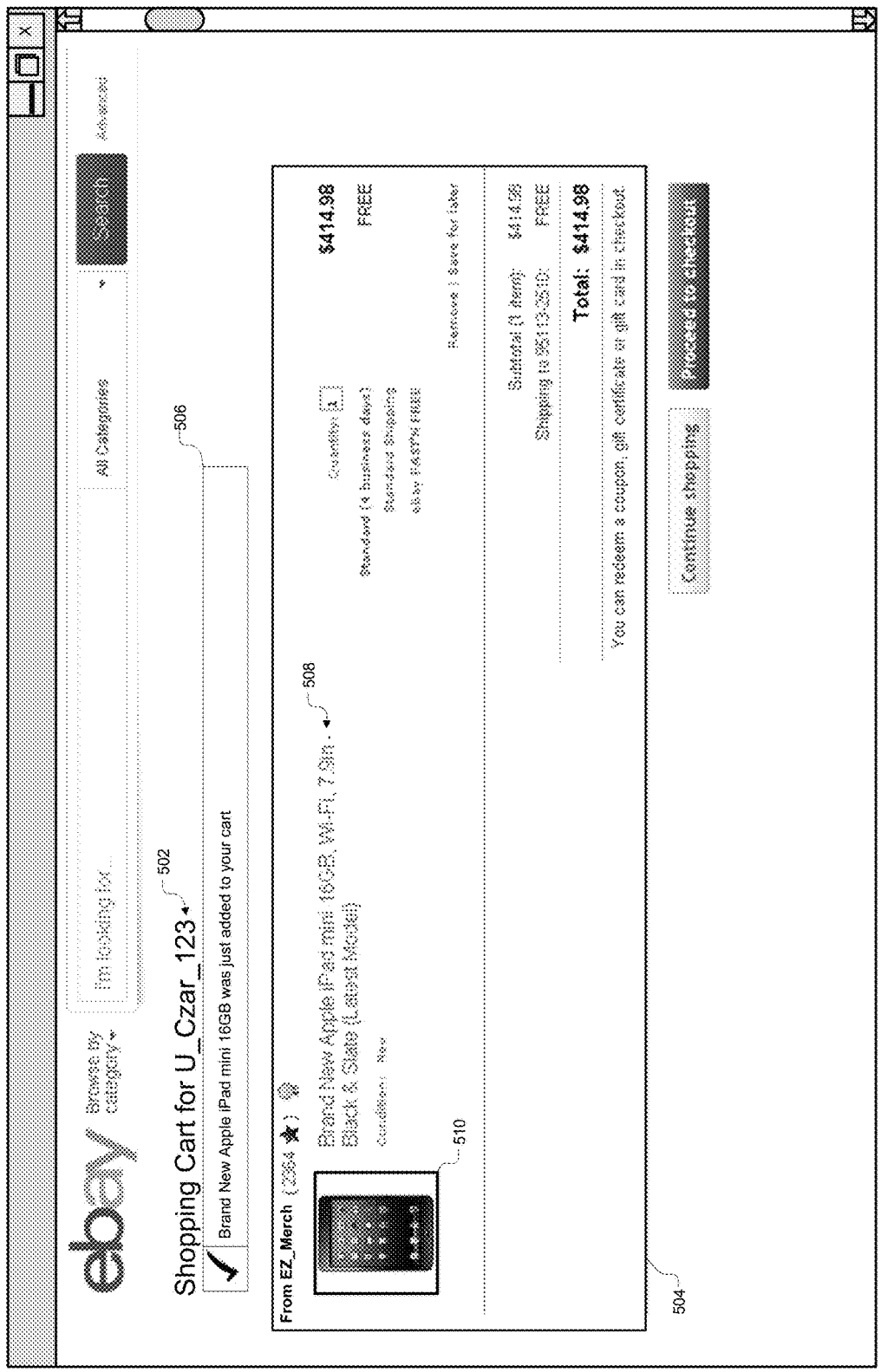
FIG. 5 is an interface diagram illustrating a portion of a user interface including user activity, according to an example embodiment.

FIG. 5 illustrates a portion of an example user interface including a virtual shopping cart of a user 502 of an online merchant. The user interface 500 includes the display of virtual shopping cart 504 provided by the online merchant. As illustrated by FIG. 5, the virtual shopping cart 504 includes a display prompt 506, which indicates that the user has added an item 508 to the virtual shopping cart 504. As illustrated in FIG. 5, the virtual shopping cart 504 may include an image 510, which displays the item 508 of the item added to the virtual shopping cart 504.

In this example embodiment, the user 502 may access the virtual shopping cart 504 on the display of client device 106 over network 104. The user activity tracking module 126 may be communicatively coupled to the client device 106 over network 104 and may track the activity of the user 502 on the website of the online merchant. The activity of the user 502 may include searching through several product listings offered by the merchant, viewing one or more product listings, adding items to the virtual cart 504 and purchasing items in the virtual shopping cart 504. In some embodiments, adding an item to the virtual shopping cart 504 may be a triggering event that triggers the posting of content to a network accessible content collection. In this embodiment, the user activity tracking module 126 may detect the adding of the item 508 to the virtual shopping cart 504, which is indicated by display prompt 506. In response, the content selection module(s) 206 may select the image 510 to be posted to a network accessible content collection.

Figure 6:
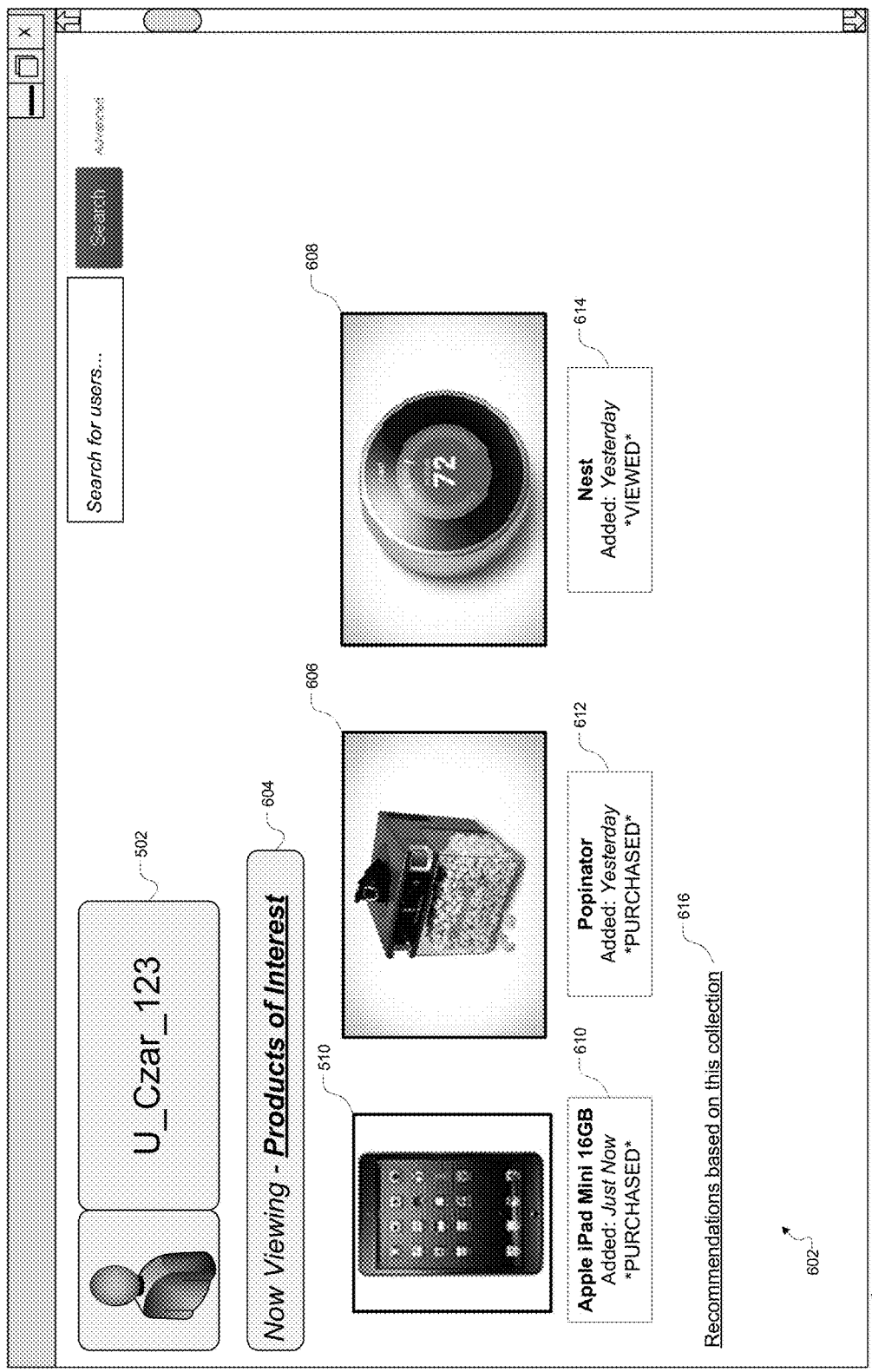
FIG. 6 is an interface diagram illustrating a portion of a user interface including populating a network accessible content collection based on user activity, according to some embodiments.

FIG. 6 illustrates a portion of an example user interface 600 including the display of a network accessible content collection 602 of the user 502. The network accessible content collection 602 may be hosted by the networked content collection module(s) 202 or third party application 116. The network accessible content collection 602 may be one of several content collections of the user 502 maintained by the network-based publisher 102.

As illustrated by FIG. 6, the network accessible content collection 602 may include an identifier 604, which may identify the particular content collection being viewed. In some embodiments, the identifier 604 may include a category assigned to the content by the organization module(s) 210. In this example, the network accessible content collection 602 includes "Products of Interest" for the user 502. In this example, the network accessible content collection 602 may include content items related to online shopping activity of the user 502.

The network accessible content collection 602 also includes the image 510, which may be posted to the network accessible content collection 602 by the posting module(s) 208 in response to the user activity tracking module 126 detecting a triggering event (e.g., adding item 508 to the virtual shopping cart 504). The network accessible content collection 602 may also include previously posted content, such as images 606 and 608. The network accessible content collection 602 may include data items 610, 612, and 614, which may provide information for each of the images 510, 606, and 608, respectively. In some embodiments, data items 610, 612, and 614 may include a link or uniform resource locator (URL) corresponding to images 510, 606, and 608 to redirect a user to the website where the content originated.

As illustrated in FIG. 6, the display of the network accessible content collection 602 may include recommendation link 616. The recommendation link 616 may link a user to a list of recommendations provided by the recommendation module 212. The list of recommendations may include additional content items related to content contained in the network accessible content collection 602.

Example Client Device

Figure 7:
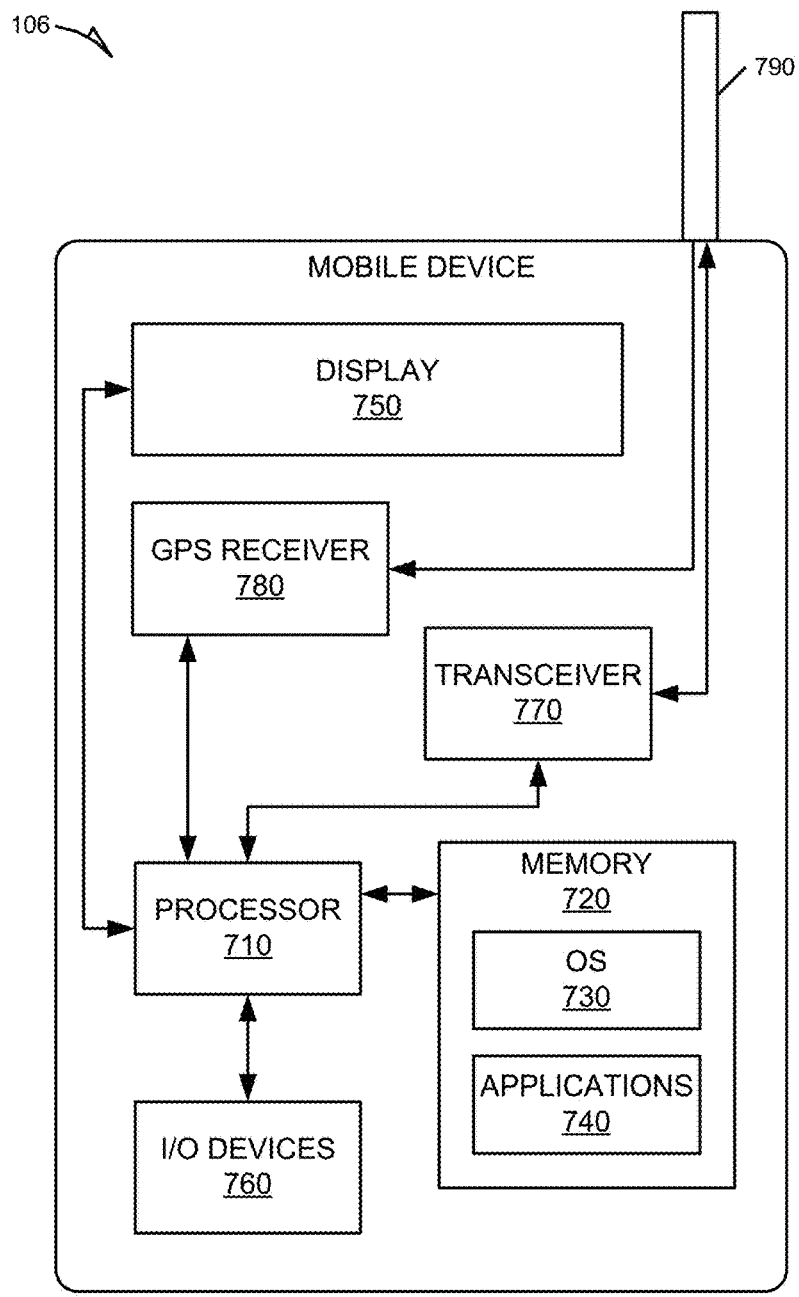
FIG. 7 is a block diagram illustrating a mobile device, according to an example embodiment.

FIG. 7 is a block diagram illustrating a client device 106, such as a mobile device, according to an example embodiment. The client device 106 may include a processor 710. The processor 710 may be any of a variety of different types of commercially available processors suitable for mobile devices (e.g., an XScale architecture microprocessor, a Microprocessor without Interlocked Pipeline Stages (MIPS) architecture processor, or another type of processor). A memory 720, such as a Random Access Memory (RAM), a Flash memory, or other type of memory, is typically accessible to the processor 710. The memory 720 may be adapted to store an operating system (OS) 730, as well as application programs 740, such as a mobile location enabled application that may provide location based services (e.g., physical location check-in) to a user. The processor 710 may be coupled, either directly or via appropriate intermediary hardware, to a display 750 and to one or more input/output (I/O) devices 760, such as a keypad, a touch panel sensor, a microphone, and the like. Similarly, in some embodiments, the processor 710 may be coupled to a transceiver 770 that interfaces with an antenna 790. The transceiver 770 may be configured to both transmit and receive cellular network signals, wireless data signals, or other types of signals via the antenna 790, depending on the nature of the mobile device 106. In this manner, the connection 118 with the network 104 may be established. Further, in some configurations, a GPS receiver 780 may also make use of the antenna 790 to receive GPS signals Modules, Components and Logic Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 8:
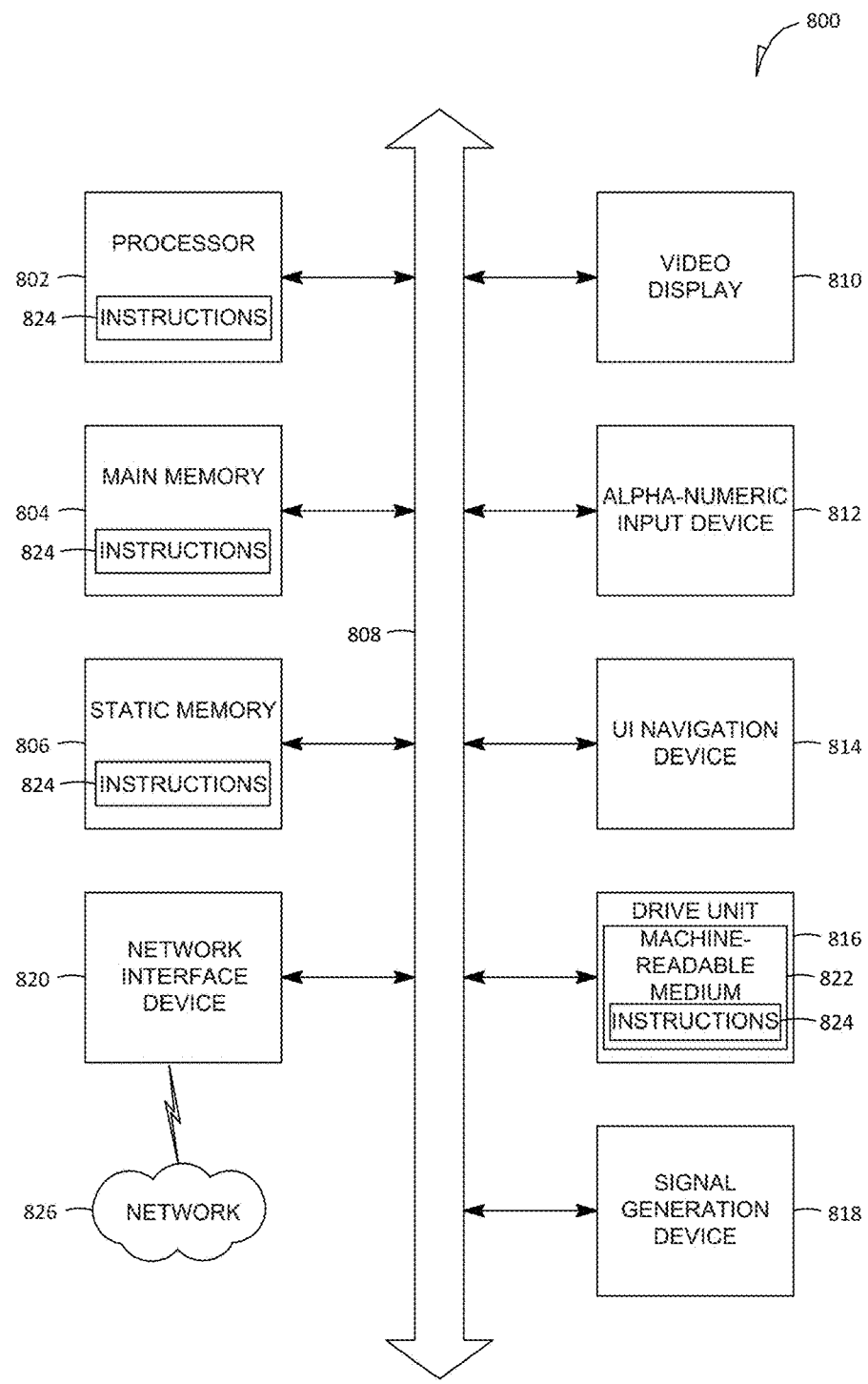
FIG. 8 is a diagrammatic representation of a machine in the example form of a computer system within which a set of instructions for causing the machine to perform any one or more of the methodologies discussed herein may be executed.

FIG. 8 is a block diagram of machine in the example form of a computer system 800 within which instructions 824 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a user interface (UI) navigation device 814 (e.g., a mouse), a disk drive unit 816, a signal generation device 818 (e.g., a speaker) and a network interface device 820.

Machine-Readable Medium

The disk drive unit 816 includes a machine-readable medium 822 on which is stored one or more sets of data structures and instructions 824 (e.g., software) embodying or used by any one or more of the methodologies or functions described herein. The instructions 824 may also reside, completely or at least partially, within the main memory 804, static memory 806, and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, and/or associated caches and servers) that store the one or more data structures or instructions 824. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
 organizing a network accessible collection of content items based on at least one attribute of each content item, each content item of the collection of content items being posted to the network accessible collection of content items in response to detecting a triggering event, the organizing of the network accessible collection of content items including assigning each content item of the collection of content items to a category, the assigning including:
  assigning a first content item to a first category corresponding to a first attribute; and
  assigning a second content item to a second category corresponding to a second attribute; and
 causing presentation of the collection of content items, the collection of content items being organized in accordance with the category assigned to each content item.

2. The method of claim 1, wherein:
 the first category corresponds to a first location; and
 the second category corresponds to a second location.

3. The method of claim 1, wherein:
 the first category corresponds to a first time period; and
 the second category corresponds to a second time period.

4. The method of claim 1, wherein:
 the first category corresponds to a first type of content; and
 the second category corresponds to a second type of content.

5. The method of claim 1, further comprising automatically posting, without user intervention, a content item to the network accessible collection of content items in response to detecting a triggering event.

6. The method of claim 5, wherein the triggering event is capturing a photograph using the client device of the user.

7. The method of claim 5, wherein the triggering event is based on a location of a mobile device.

8. The method of claim 1, wherein the operations further comprise organizing content items within each category based on a file type of each content item.

9. The method of claim 1, wherein the collection of content items includes at least one of the group comprising: a video file, audio file, image file, and text file.

10. A system comprising:
one or more processors of a machine, and
a machine-readable medium storing instructions that, when executed by the one or more processors, cause the machine to perform operations comprising:
organizing a network accessible collection of content items based on at least one attribute of each content item, each content item of the collection of content items being posted to the network accessible collection of content items in response to detecting a triggering event, the organizing of the network accessible collection of content items including assigning each content item of the collection of content items to a category, the assigning including:
assigning a first content item to a first category corresponding to a first attribute; and
assigning a second content item to a second category corresponding to a second attribute; and
causing presentation of the collection of content items, the collection of content items being organized in accordance with the category assigned to each content item.

11. The system of claim 10, wherein:
the first category corresponds to a first location; and
the second category corresponds to a second location.

12. The system of claim 10, wherein:
the first category corresponds to a first time period; and
the second category corresponds to a second time period.

13. The system of claim 10, wherein:
the first category corresponds to a first type of content; and
the second category corresponds to a second type of content.

14. The system of claim 10, further comprising automatically posting, without user intervention, a content item to the network accessible collection of content items in response to detecting a triggering event.

15. The system of claim 14, wherein the triggering event s capturing a photograph using the client device of the user.

16. The system of claim 14, wherein the triggering event is based on a location of a mobile device.

17. The system of claim 10, wherein the operations further comprise organizing content items within each category based on a file type of each content item.

18. The system of claim 10, wherein the collection of content items includes at least one of the group comprising: a video file, audio file, image file, and text file.

19. The system of claim 10, further comprising organizing the network accessible collection of content items based on one or more attributes of the content items, the one or more attributes including at least one of a group comprising: subject matter, content type, timing, location, color, or size.

20. A non-transitory machine-readable storage medium embodying instructions that, when executed by a machine, cause the machine to perform operations comprising:
organizing a network accessible collection of content items based on at least one attribute of each content item, each content item of the collection of content items being posted to the network accessible collection of content items in response to detecting a triggering event, the organizing of the network accessible collection of content items including assigning each content item of the collection of content items to a category, the assigning including:
assigning a first content item to a first category corresponding to a first attribute; and
assigning a second content item to a second category corresponding to a second attribute; and
causing presentation of the collection of content items, the collection of content items being organized in accordance with the category assigned to each content item.

* * * * *

UNITED STATES PATENT AND TRADEMARK OFFICE
CERTIFICATE OF CORRECTION

PATENT NO. : 10,476,935 B2
APPLICATION NO. : 16/046060
DATED : November 12, 2019
INVENTOR(S) : Mark Delun Yuan Page 1 of 1

It is certified that error appears in the above-identified patent and that said Letters Patent is hereby corrected as shown below:

On the Title Page

In item (63), in Column 1, in "Related U.S. Patent Documents", Line 4, delete "16," and insert -- 10, --, therefor.

In the Claims

In Column 18, Line 11, in Claim 15, delete "s" and insert -- is --, therefor.

Signed and Sealed this
Twenty-first Day of July, 2020

Andrei Iancu
*Director of the United States Patent and Trademark Office*